United States Patent [19]
Thorsby et al.

[11] 3,715,114
[45] Feb. 6, 1973

[54] SHOCK ABSORBING BUMPER
[75] Inventors: Claude A. Thorsby, Saginaw; Robert L. White, Frankenmuth, both of Mich.
[73] Assignee: General Motors Corporation, Detroit, Mich.
[22] Filed: Oct. 7, 1971
[21] Appl. No.: 187,418

[52] U.S. Cl. .................267/140, 188/268, 213/43, 213/221, 293/70, 293/85, 293/88, 293/89
[51] Int. Cl. .........B61f 19/02, B61f 19/04, F16f 9/30
[58] Field of Search .......188/1 B, 1 C, 1 D, 1 R, 268, 188/317; 213/43, 221, 222; 267/134, 135, 139, 140; 293/70, 85, 88, 89

[56] References Cited

UNITED STATES PATENTS

| | | | |
|---|---|---|---|
| 1,648,394 | 11/1927 | Gates | 295/85 |
| 3,053,526 | 9/1962 | Kendall | 188/268 X |
| 3,379,317 | 4/1968 | Carlson | 267/134 X |
| 3,379,319 | 4/1968 | Stasieluk | 188/268 X |

*Primary Examiner*—Drayton E. Hoffman
*Assistant Examiner*—Howard Beltran
*Attorney*—W. E. Finken et al.

[57] ABSTRACT

An energy absorbing support unit for an automobile bumper bar, the support unit including a pair of telescopically related tube members adapted for disposition between the bumper bar and the vehicle chassis, an orificed piston rigidly attached to one tube member and adapted to effect throttled flow of an incompressible medium situated in a chamber in the other tube member to effect energy absorption, a free piston slidably mounted in the one tube member and resiliently biased toward a normal position corresponding to a fully extended position of the one tube member, the free piston urging reverse flow of the incompressible medium to provide a self-restoring preload on the one tube member, and a reciprocating valve member on the free piston movable between an open position and a closed position partially obstructing the piston orifices to increase the rate of energy absorption. The free piston, in the normal position thereof, engages the valve member to positively locate the latter in the open position whenever the one tube member is in its fully extended position.

4 Claims, 5 Drawing Figures

PATENTED FEB 6 1973

INVENTORS
Claude A. Thorsby &
BY Robert L. White
Saul Schwartz
ATTORNEY

INVENTORS
Claude A. Thorsby &
BY Robert L. White
Saul Schwartz
ATTORNEY

SHOCK ABSORBING BUMPER

The invention relates generally to energy absorbing devices of the telescopically collapsible type and more particularly to an improved energy absorber having valve means adapted to vary the resistance to collapse and hence the rate of energy absorption from a minimum at the instant collapse commences to a maximum at some point in time thereafter.

In the automotive field, it has been suggested that certain beneficial results are obtainable by supporting the collision bumper bar of the vehicle on the chassis of the vehicle by means of energy absorbing units which cushion impacts on the bar and absorb the energy of impact before contact is made with the body sheet metal. With respect to such installations it has also been suggested that further beneficial results might be obtained by varying the rate of energy absorption from a minimum at the instant of impact to a maximum at some point in time thereafter. Numerous designs for energy absorber units processing this characteristic have been suggested. Most, however, are unsatisfactory for any number of reasons including undue complexity and performance unreliability. An energy absorber according to this invention represents an improvement over known similar devices having the characteristic described in that it is relatively simple in construction and very reliable in operation.

Accordingly, the primary feature of this invention is that it provides an improved energy absorber having a variable rate of energy absorption, the energy absorber being particularly suitable for supporting a collision bumper bar on an automobile chassis. Another feature of this invention is that it provides an improved energy absorber of the telescopically collapsible oleo-strut type including valve means for varying the rate of energy absorption and positioning means adapted to positively locate the valve means in a predetermined position insuring minimum initial resistance to telescopic collapse from a fully extended condition of the energy absorber. Still other features of this invention reside in the provision, in an energy absorber of the oleo-strut type including a working piston for throttling fluid flow to absorb energy and a free piston resiliently biased in one direction to preload the energy absorber, of a valve means on the working piston movable between open and closed positions to vary the rate of energy absorption and in the provision of means on the free piston and on the valve means engageable in the fully extended condition of the energy absorber to positively locate the valve means in the open position.

These and other features of this invention will be readily apparent from the following specification and from the drawings wherein.

Figure 1:
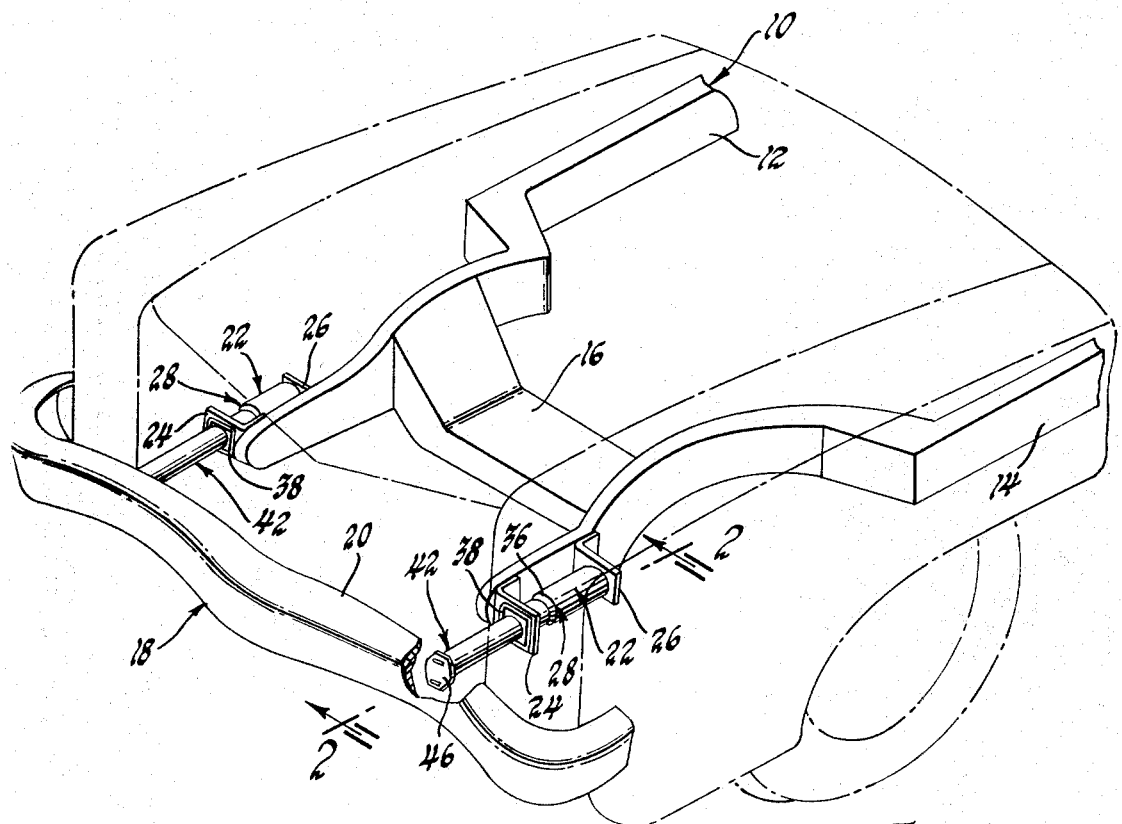
FIG. 1 is a perspective view of the forward portion of an automobile frame having a collision bumper structure supported thereon by a pair of improved energy absorbing support units according to this invention.

Referring now to FIG. 1 of the drawings, there shown in simplified form is an automobile frame designated generally 10 including a pair of longitudinally extending side rails 12 and 14, the side rails being interconnected at the forward end of the frame by a rigid cross member 16. A collision bumper structure 18, including a bumper bar 20, is supported on the frame by a pair of identical energy absorbing support units for absorbing shocks according to this invention and designated generally 22, each support unit being rigidly attached to a respective one of the frame rails 12 and 14 by a front bracket 24 and a rear bracket 26 each bolted to the frame rails. It will be understood, of course, that rather than the separate frame illustrated herein, the support units according to this invention are equally well adapted for use with unibody vehicle constructions.

Figure 2:
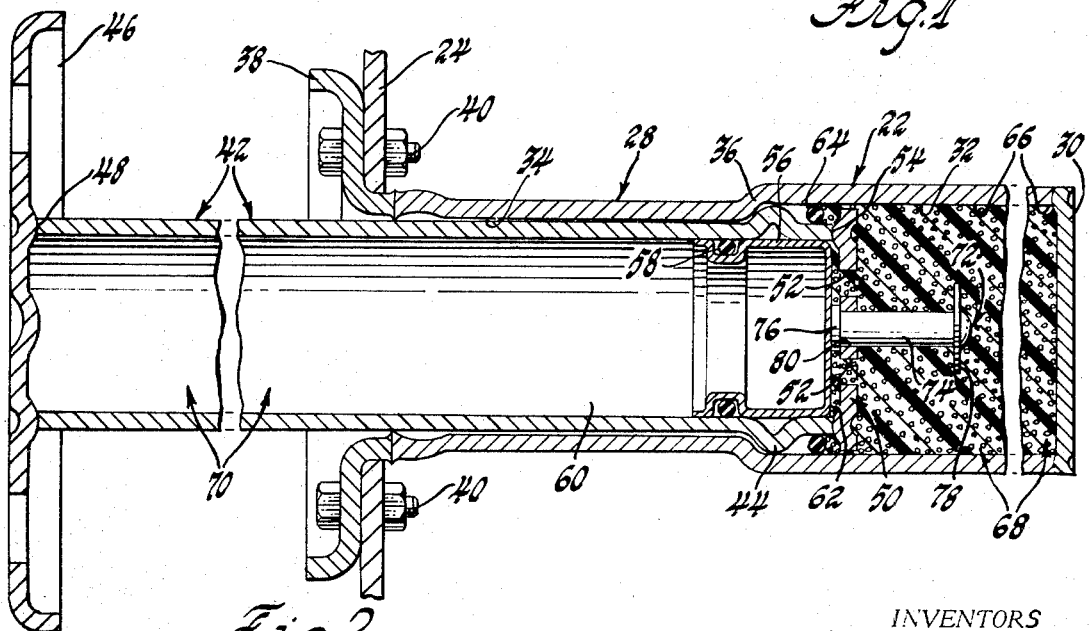
FIG. 2 is an enlarged sectional view taken generally along the plane indicated by lines 2—2 in FIG. 1 and showing the support unit in a fully extended condition.
Figure 3:
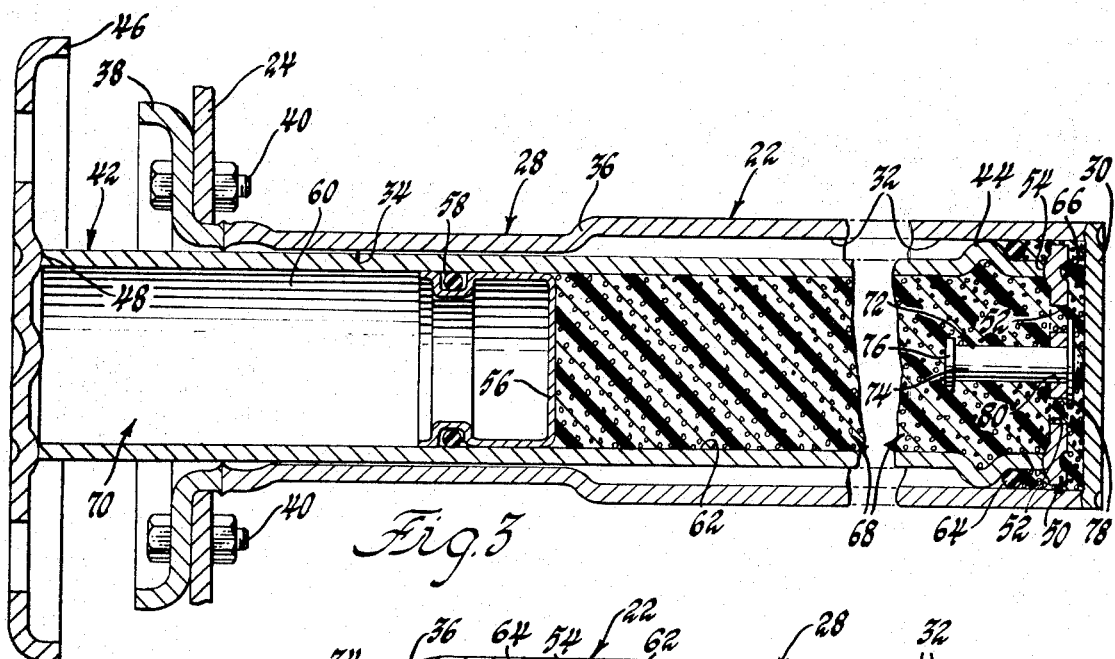
FIG. 3 is a view similar to FIG. 2 but showing the support unit in a fully collapsed condition.

Referring now to FIGS. 2 and 3 and describing only one support unit 22, the latter includes a cylindrical mounting tube 28 closed at one end by an end plate 30. The mounting tube has a large diameter portion 32 adjacent the end plate 30 and a small diameter portion 34 extending from the open end of the mounting tube, the small and large diameter portions being interconnected by an annular shoulder portion 36. An attaching flange 38 is butt welded to the small diameter portion of the mounting tube and is adapted for rigid connection to the bracket 24, as by bolts 40, while the end plate 30 is adapted by conventional means, not shown, for rigid connection to the bracket 26.

A cylindrical support tube 42 is closely slidably received in the small diameter portion 34 of the mounting tube 28 and includes an annular abutment portion 44 having an outside diameter generally equal to the inside diameter of large diameter portion 32 of the mounting tube. Accordingly, the support tube is slidably supported on the mounting tube with substantial lateral rigidity for axial telescopic collapse from a fully extended position corresponding to the fully extended condition of the support unit, FIG. 2, defined by engagement between the annular abutment 44 and shoulder portion 36 to a fully collapsed position corresponding to the fully collapsed condition of the support unit, FIG. 3, wherein the inboard end of the support tube is disposed adjacent end plate 30. The outboard end of the support tube is sealingly closed by a mounting flange 46 butt welded to the support tube at 48, the flange 46 being adapted for rigid connection to the bumper bar 20.

As seen best in FIGS. 2 and 3, a circular working piston 50 having a plurality of orifices 52 arranged in a circular pattern around the center of the piston is rigidly attached to the inboard end of support tube 42, as by a butt weld at 54. A free piston 56 is slidably disposed within the support tube 42 and carries a sealing ring 58, the piston and sealing ring dividing the support tube into two variable volume chambers 60 and 62. A sealing ring 64 disposed about the support tube 42 between the annular abutment 44 and the piston 50 forms a seal for a third variable volume chamber 66 generally defined by large diameter portion 32 of the mounting tube, end plate 30, and piston 50.

Referring again to FIGS. 2 and 3, the chamber 66 has a maximum volume in the fully extended position of the support tube 42 and is completely filled with a flowable and incompressible medium 68. The incompressible medium may be a liquid or any one of many commercially available silicon compounds and is adapted for throttled flow from chamber 66, through the orifices 52, into chamber 62 in response to telescopic collapse of the mounting tube 42 from the fully extended position toward the fully collapsed position. The throttling of the medium 68 through the orifices 52 effects dissipation or absorption of energy transferred to the support unit by an impact on the outboard end of the support tube 42.

The throttled incompressible medium, of course, exerts pressure on the free piston 56 urging the latter leftward relative to the mounting tube 42 thereby to expand chamber 62 while simultaneously reducing the volume of chamber 60. The chamber 60 is filled with a compressible medium 70, preferably a gas, which increasingly resists relative leftward movement of the free piston 56 thereby to generate on the latter a rightwardly directed force urging reverse flow of the incompressible medium from the chamber 62 into the chamber 66. The compressible medium 70 is normally introduced into the chamber 60 under substantial initial pressure so that the free piston 56 is forced rightwardly relative to the support tube to a normal position, FIG. 2, juxtaposed to working piston 50 during which movement substantially all of the incompressible medium 68 is evacuated from the chamber 62 into the chamber 66, the pressure exerted on the medium 68 by the compressible medium 70 through the free piston effecting relative extension of the support tube to the fully extended position under a preload depending upon the initial pressure of the compressible medium 70.

As best seen in FIGS. 2 and 3, a valve member 72 is provided to effect the desirable result of relatively low resistance to initial telescopic collapse of the support tube and higher resistance to continued collapse, the valve member including a cylindrical shank portion 74 having a head portion 76 at one end and a restricting portion 78 at the other end. The shank portion 74 of the valve member is slidably supported in an aperture 80 in the working piston 50 with the head portion 76 on one side of the piston and the restricting portion 78 on the other for reciprocative movement relative to the piston between an open position, FIG. 2, wherein the orifices 52 are unobstructed and a closed position, FIG. 3, wherein the restricting portion 78 partially obstructs the orifices 52 to reduce the effective area of the latter. When the free piston 56 is in its normal position, FIG. 2, corresponding to the fully extended condition of the support unit, the head portion 76 of the valve member 72 is captured between the working piston and the face of the free piston so that the valve member is held in the open position.

The differential area of the valve member 72 exposed to the prevailing pressure in the chamber 66 cooperates with the medium 68 to move the valve member from the open position to the closed position in response to telescopic collapse of the support tube 42. More particularly, the piston 50, in response to a collapsing impact on the support tube 42, places the medium 68 in chamber 66 under a pressure exceeding the pressure in chamber 62 thereby initiating flow of the medium 68 through the unobstructed orifices 52 so that collapsing movement of the support tube begins against minimum resistance. The throttled working medium entering chamber 62 forces the free piston 56 leftward into the support tube thereby freeing the head portion 76 and the valve member to permit movement of the latter from the open to the closed position. The higher pressure in chamber 66 acting on the differential area of the valve member, i.e., the cross sectional area of the valve member shank portion 74, which is exposed to high pressure on one side and a lower pressure on the other side, initiates movement of the valve member from the open position toward the closed position so that at some point in time after the initial impact when the valve member reaches the closed position with the restricting portion seated on the face of the working piston and partially obstructing the orifices 52, the incompressible medium is throttled through the substantially reduced orifices thereby effecting an increase in the resistance to further telescopic collapse and hence an increase in the rate of energy absorption.

After the collapse causing impact on the support unit ceases, the compressed medium 70 acting on the free piston 56 initiates reverse flow of the incompressible medium 68 to telescopically extend the support tube, the reverse flow being the result of the pressure in chamber 62 which now exceeds the pressure in chamber 66. The initial pressure at which the compressible medium 70 is introduced into chamber 60 is predetermined to insure that after impact the free piston will return virtually to its normal position thereby insuring that substantially all of the medium 68 returns to chamber 66 and, consequently, that the support tube 42 returns to the extended position. Return of the free piston to its normal position also insures that the valve member 72 will be in the open position to provide minimum resistance to another collapse cycle of the support unit. More particularly, as the support tube 42 begins to extend from the fully collapsed position, FIG. 3, the prevailing pressure in chamber 62 acting on the same differential area of the valve member but in a reverse direction effects movement of the valve member 72 from the closed position, FIG. 3, back to the open position, FIG. 2, some time before the support tube reaches the fully extended position. That such will be the case is, however, positively insured by the free piston 56, the face of which engages the head portion 76 of the valve member to locate the latter in the open position when the free piston and the support tube respectively reach the normal and extended positions. In addition, with the head portion 76 captured between the free piston and the working piston there is no possibility of the valve member 72 inadvertently moving to the closed position as a result of vibrations or the like.

Figure 4:
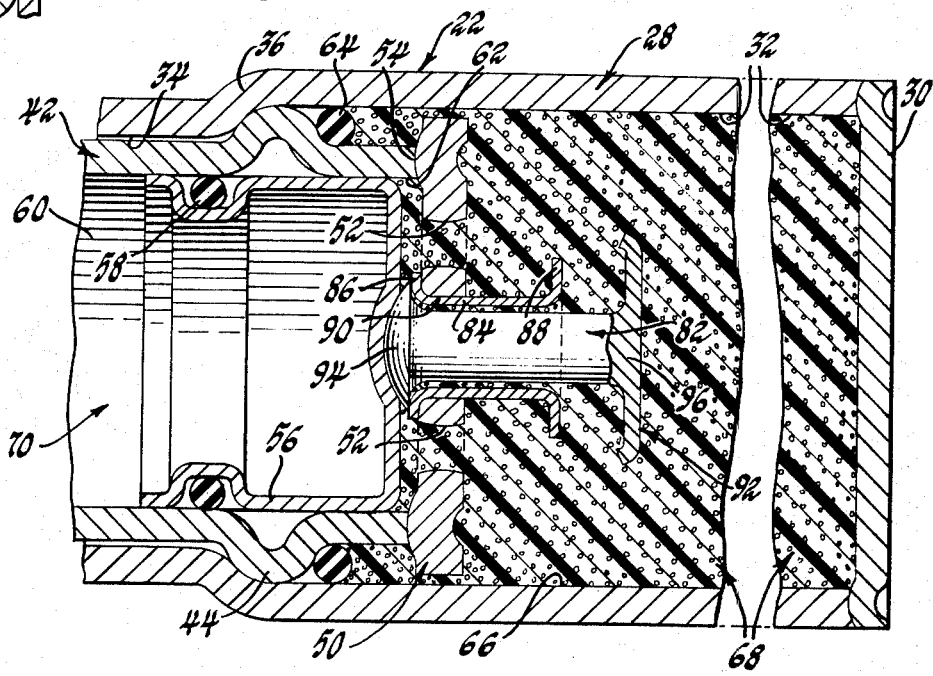
FIG. 4 is an enlarged view of a portion of FIG. 1 showing a modified valve construction in an open position corresponding to the fully extended condition of the support unit.
Figure 5:
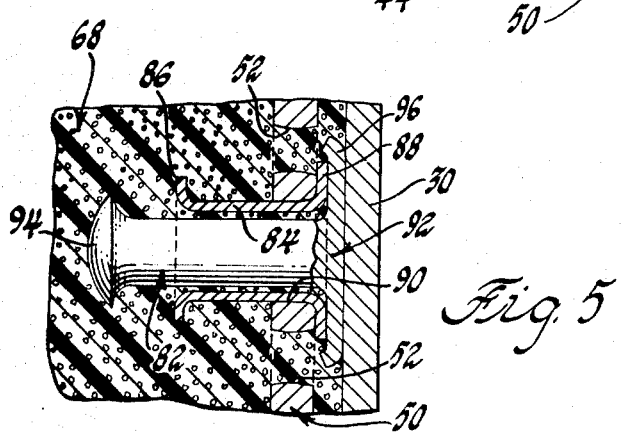
FIG. 5 is a view similar to FIG. 4 but showing the modified valve construction in a closed position corresponding to the fully collapsed condition of the support unit.

Referring now to FIGS. 4 and 5, thereshown is a modified or composite valve member designated generally 82 adapted to effect obstruction of the orifices 52 in the working piston 50 in two stages as opposed to the single stage obstruction described hereinbefore with respect to valve member 72. More particularly, the modified valve member 82 includes a cylindrical collar 84 having a retaining flange 86 at one end thereof and an enlarged restricting flange 88 at the other end thereof. The collar is slidably supported in a central aperture 90 in the piston 50 with the retaining flange on one side of the latter and the restricting flange on the other. A valve element 92 is slidably supported on the collar 84 and includes a head portion 94 outboard of the restricting flange 86 and a restricting portion 96 outboard of the restricting flange 88.

As seen best in FIG. 4, when the free piston 56 is in its normal position corresponding to the fully extended position of the support tube 42, the face of the free position engages the head portion 94 of the modified valve member 82 to positively locate the latter in an open position, FIG. 4, wherein both the restricting flange 88 and the restricting portion 96 are situated remote from the orifices 52 so that the latter are unobstructed. With the head portion and retaining flange thus captured, inadvertent movement of the modified valve member out of the open position is effectively foreclosed.

When the support tube 42 is collapsed under impact from the fully extended position, the incompressible medium 68 is throttled through the unobstructed orifices to effect energy absorption at a first, minimum rate and thereafter displaces the free piston 56 leftwardly with respect to the support tube to permit unitary leftward movement of the collar 84 and the valve element 92 relative to the working piston 50. Such movement corresponds to movement of the modified valve member from the open position to a first closed position, not shown, wherein restricting flange 88 seats against piston 50 and partially obstructs orifices 52. Such partial obstruction effects a first increase in the resistance to telescopic collapse of the support tube 42 and hence a first increase in the rate of energy absorption.

Continued telescopic collapse of the support tube effects further leftward bodily movement of the valve element 92 relative to the piston 50 and the collar 84 until the restricting portion 96 seatingly engages the restricting flange 88, FIG. 5, thus defining a second closed position of the modified valve member 82. In the second closed position the restricting portion 96 further obstructs the orifices 52 thereby to effect a second and higher rate of energy absorption. When the collapse causing impact on the support tube 42 ceases, the compressed medium 70 in the chamber 60 effects reverse flow of the incompressible medium 66 until the free piston 56 engages the head portion 94 to once again insure positive location of the modified valve member in the open position.

Having thus described the invention, what is claimed is:

1. In an energy absorber of the collapsible type, including a pair of telescopically related tube members and a piston rigidly attached to one of said tube members and having a plurality of orifices therein and a free piston slidably disposed in said one tube member, wherein an incompressible working medium in the other of said tube members is throttled through said piston orifices during relative telescopic collapse between said tube members to effect energy absorption and wherein the throttled incompressible medium exerts a pressure on said free piston to compress a compressible working medium in said one tube member on the opposite side of said free piston thereby to generate a restoring force urging relative extension between said tube members to a fully extended condition, the improvement comprising, a valve member disposed on said orificed piston for reciprocative movement relative to the latter between an open position wherein said orifices are unobstructed and a closed position wherein said orifices are partially obstructed for effecting increased resistance to flow of said incompressible working medium and consequently energy absorption at an increased rate, means on said valve member cooperable with said incompressible working medium to effect movement of said valve member from the open position to the closed position in response to relative collapse between said tube members from the fully extended condition for increasing the rate of energy absorption after initiation of collapse, and means on said valve member and on said free piston cooperable to effect positive location of said valve member in the open position thereof when said tube members achieve the fully extended condition thereby to ensure minimum resistance to initial telescopic collapse between said tube members from the fully extended condition.

2. In an energy absorber of the collapsible type, including a pair of telescopically related tube members and a piston rigidly attached to one of said tube members and having a plurality of orifices therein and a free piston slidably disposed in said one tube member, wherein an incompressible working medium in the other of said tube members is throttled through said piston orifices during relative telescopic collapse between said tube members to effect energy absorption and wherein the throttled incompressible medium exerts pressure on said free piston to move the latter relative to said one tube member from a normal position corresponding to a fully extended condition of said tube members thereby to compress a compressible medium in said one tube member on the opposite side of said free piston for generating a restoring force urging relative extension between said tube members to the fully extended condition, the improvement comprising, a valve member having a head portion on one end and a restricting portion on the other end, means mounting said valve member on said orificed piston with said head portion disposed on one side of said orificed piston and said restricting portion disposed on the other side for reciprocative movement relative to said orificed piston between an open position wherein said orifices are unobstructed and a closed position wherein said orifices are partially obstructed for effecting increased resistance to flow of said incompressible working medium and consequently energy absorption at an increased rate, means on said valve member cooperable with said incompressible working medium to effect movement of said valve member from the open position to the closed position in response to relative collapse between said tube members from the fully extended condition for increasing the rate of energy absorption after initiation of collapse, and means on said free piston engageable on said valve member head portion in the normal position of said free piston to positively locate said valve member in the open position thereby to ensure minimum resistance to initail telescopic collapse between said tube members from the fully extended condition.

3. In an energy absorber of the collapsible type, including a pair of telescopically related tube members and a piston rigidly attached to one of said tube members and having a plurality of orifices therein and a free piston slidably disposed in said one tube member, wherein an incompressible working medium in the other of said tube members is throttled through said piston orifices during relative telescopic collapse between said tube members to effect energy absorption and wherein the throttled incompressible medium exerts pressure on said free piston to move the latter relative to said one tube member from a normal position corresponding to a fully extended condition of said tube members to compress a compressible medium in said one tube member on the opposite side of said free piston for generating a restoring force urging relative extension between said tube members to the fully extended condition, the improvement comprising, a composite valve member having a head portion and a first restricting portion and a second restricting portion bodily movable relative to said first restricting portion, means mounting said composite valve member on said orificed piston with said head portion on one side of said orificed piston and each of said first and said second restricting portions on the other side for sequential reciprocative movement relative to said orificed piston between an open position wherein said orifices are unobstructed and a first closed position wherein said second restricting portion partially obstructs said orifices to effect increased resistance to flow of said incompressible working medium and a second closed position wherein said first restricting portion further obstructs said orifices to effect further resistance to flow of said incompressible medium, means on said composite valve member cooperable with said incompressible medium to effect sequential movement of said composite valve member from the open position to the first closed position and to the second closed position in response to relative telescopic collapse between said tube members from the fully extended condition thereby for effecting sequential increase in the resistance to flow of said incompressible medium and consequently energy absorption at an increased rate after the initiation of collapse, and means on said free piston engageable on said composite valve member head portion in the normal position of said free piston to positively locate said composite valve member in the open position thereof thereby to insure minimum resistance to initial telescopic collapse between said tube members from the fully extended condition.

4. In an energy absorber of the collapsible type, including a pair of telescopically related tube members and a piston rigidly attached to one of said tube members and having an orifice therein and a free piston slidably disposed in said one tube member, wherein an incompressible working medium in the other of said tube members is throttled through said piston orifice during relative telescopic collapse between said tube members to effect energy absorption and wherein the throttled incompressible medium exerts a pressure on said free piston to effect bodily shiftable movement thereof relative to said one tube member and compression of a compressible working medium in said one tube member on the opposite side of said free piston thereby to generate a restoring force urging relative extension between said tube members to a fully extended condition, the improvement comprising, restricting means associated with said piston orifice and adapted for bodily shiftable movement relative to said piston between a first position corresponding to the fully extended condition of said tube members wherein maximum flow of said working medium is permitted and a second position corresponding to at least a partially collapsed condition of said tube members wherein said position orifice is partially obstructed thereby to restrict the flow of said working medium, means on said free piston and on said restricting means adapted to positively locate said restricting means in the first position thereof when said tube members are in the fully extended condition, and means on said free piston and on said restricting means operative to effect unitary movement of said free piston with said restricting means during movement of the latter from the first to the second position thereof in response to collapse of said tube members from the fully extended condition.

* * * * *